(12) United States Patent
Cotonnec et al.

(10) Patent No.: US 6,810,068 B2
(45) Date of Patent: Oct. 26, 2004

(54) ELECTRIC GLASS MELTING FURNACE, WITH PIVOTING WALL ELEMENTS

(75) Inventors: Hervé Cotonnec, Piolenc (FR); Gérard Delahalle, Conflans Sainte-Honorine (FR)

(73) Assignee: Saint-Gobain Isover, Courbevoie (FR)

( * ) Notice: Subject to any disclaimer, the term of this patent is extended or adjusted under 35 U.S.C. 154(b) by 0 days.

(21) Appl. No.: 10/399,037

(22) PCT Filed: Oct. 17, 2001

(86) PCT No.: PCT/FR01/03204
§ 371 (c)(1),
(2), (4) Date: Apr. 17, 2003

(87) PCT Pub. No.: WO02/32819
PCT Pub. Date: Apr. 25, 2002

(65) Prior Publication Data
US 2004/0081219 A1 Apr. 29, 2004

(30) Foreign Application Priority Data
Oct. 18, 2000 (FR) .......................................... 00 13308

(51) Int. Cl.⁷ ............................................... C03B 5/02
(52) U.S. Cl. ............................................ 373/27; 373/71
(58) Field of Search .............................. 373/27, 29–35, 373/71, 72, 73, 75, 77, 9; 266/158; 204/245, 247; 312/322; 65/135.6, 135.7, 135.9, 335

(56) References Cited

U.S. PATENT DOCUMENTS

| | | | |
|---|---|---|---|
| 3,045,994 A | | 7/1962 | Longenecker |
| 4,720,837 A | * | 1/1988 | Kanada ........................ 373/73 |
| 5,030,335 A | * | 7/1991 | Olsen .......................... 373/73 |
| 5,645,333 A | * | 7/1997 | Sakurai ....................... 312/322 |
| 6,125,658 A | | 10/2000 | Maugendre et al. |

FOREIGN PATENT DOCUMENTS

| | | |
|---|---|---|
| BE | 894 795 | 2/1983 |
| GB | 850 269 | 10/1960 |

OTHER PUBLICATIONS

Patent Abstracts of Hungary, HU 0001448, Aug. 28, 2000 (with corr. US 6,125,658).

\* cited by examiner

*Primary Examiner*—Tu Ba Hoang
(74) *Attorney, Agent, or Firm*—Oblon, Spivak, McClelland, Maier & Neustadt, P.C.

(57) ABSTRACT

An electric glass-melting furnace including a floor made of refractory materials, four lateral walls, an upper roof, a glass composition feeder, and an output channel for the melted glass. The furnace includes a set of elements pivoting about horizontal axes and placed at the periphery of the furnace between at least one of the lateral walls and the roof.

10 Claims, 3 Drawing Sheets

ELECTRIC GLASS MELTING FURNACE, WITH PIVOTING WALL ELEMENTS

The present invention relates to electric glass-melting techniques and more particularly those in which the conductivity of the molten glass is used in order to develop the power needed to melt the raw materials.

For a long time, glass-producing plants operating on large quantities of material have been provided with melting furnaces powered with fossil fuel, especially gas. This was in particular the case for high capacity continuous production plants supplying, for example, flat glass or bottle glass. In these large furnaces, electricity, when it was used, was mainly used as a local top-up in order to maintain the temperature of the glass in the cooler regions, or, outside the furnace, on its path toward the location of transformation or else in order to develop certain convection movements assumed to enhance the homogenization, the refining or the transport of the molten material.

Electric melting itself firstly appeared in small units for which considerable flexibility of conditions of use seemed necessary. The fluctuations in energy costs and the progressive mastering of some problems of a technological nature led more recently to the development of large production units in which the whole melting process, with the exception of the start-up, takes place while having recourse to electricity. This development requires extremely tricky technological problems to be solved.

Hence, in particular to avoid the question of oxidation of the electrodes at the surface of the molten bath, it was proposed to immerse them completely. This is the solution retained, for example, in French patent application published under No. FR-A-2 552 073. In this document, the electrodes are arranged vertically in the bath from the floor of the furnace. In other embodiments, electrodes passing through the lateral walls of the furnace are also found.

Independently of the advantages that it affords with respect to problems of corrosion, the immersion of the electrodes also make possible a convenient and very uniform power supply to the surface of the bath with a raw material composition. The constitution of a relatively thick layer of composition to be melted, floating on the molten bath, is in fact useful for several reasons. On contact with the molten bath, it forms the permanent reserve of material needed for continuous operation. It also protects the molten bath from high energy loss by convection in contact with the atmosphere and especially by radiation.

Although the furnaces of the type described in the aforementioned document find very wide industrial applications, they do not necessarily make it possible to respond as well as possible to all the requirements encountered in practice. By way of example, it is desirable, in some cases, and with the obvious aim of limiting investment costs, to transform plants operating with burners by retaining as much as possible of the existing elements and especially the refractory materials constituting the tank. A transformation of this sort is not always possible when it involves implanting electrodes in the floor or in the lateral walls of the furnace.

Furnaces whose electrodes are immersed by means of the floor or the walls of the vessel offer limited possibilities for controlling the electrodes. Although they lead to very satisfactory performances for certain conditions, they adapt less well to frequent and/or substantial modifications of these operating conditions.

It is for this reason that furnaces called "furnaces with plunging electrodes" have sometimes been preferred. Thus, French patent FR 2 599 734 describes a furnace of this type in which the electrodes are arranged and distributed so as to optimize the efficiency of the furnace and above all its flexibility of use.

Conventionally, this type of furnace comprises a floor made of a refractory material, four lateral walls or upstands, an upper roof, a glass composition supply means and an output channel for the molten glass.

It may also comprise side panels which can be moved vertically, intended to isolate the bath from the surrounding atmosphere at certain moments of the glass formation process.

The thermal insulation of the bath of glass is in fact a major problem in glass-making furnaces.

The present invention provides a solution to this problem which is both new and original.

In fact, it allows a selective and controlled insulation of the furnace, which furthermore is multi-purpose and efficient.

These characteristics cannot be found anywhere in the prior art which, at best, relates to a system of the "all or nothing" type with regard to insulation of the furnace. Moreover, experience has shown that when the lateral panels which can be moved vertically are closed, the insulation of the furnace is not correctly provided, in particular because of the clearances between the panels.

Advantageously, the leaktightness of the furnace is perfectly preserved according to the invention.

Thus, the subject of the invention is an electric glass-melting furnace comprising a floor made of a refractory material, four lateral walls or upstands, an upper roof, a glass composition feed means and an output channel for the melted glass.

According to the invention, it further comprises a set of elements pivoting about horizontal axes and placed at the periphery of the furnace between at least one of the lateral walls and the roof.

The modularity of the furnace insulation is thus produced as a result of there being a set of pivoting elements and not a single element per side.

Furthermore, the melting elements are (flat) juxtaposed panels, the thicknesses of which are cut vertically so as to create a perfect seal between two contiguous panels.

An arrangement of this sort guarantees a seal between each of the panels and therefore an overall seal comparable to that obtained with a single panel.

According to a particular feature of the invention, the furnace further comprises a set of cables, pulleys and winches intended to make said pivoting elements pivot individually or in a group.

Thus, depending on the type of use chosen, or even the time of the glass manufacturing process, a larger or smaller number of pivoting elements will be able to be open, which makes it possible to adjust the thermal insulation of the furnace.

According to another particular feature of the invention, the furnace further comprises a mechanism for locking the pivoting elements in the open position.

Furthermore, the furnace according to the invention may comprise a system for unlocking the pivoting elements.

This aspect of the invention provides perfect security of operation of the pivoting elements and hence control of the overall insulation of the furnace.

According to an interesting aspect of the invention, the pivoting elements are mechanically reinforced by elements such as rods implanted within their thickness. The rods are preferably metallic.

According to one embodiment of the invention, the pivoting elements are arranged over at least three lateral sides of the furnace.

The present invention may be used in a furnace of the plunging electrode type. In this case, provision may be made to arrange at least one pivoting element opposite each plunging electrode.

In compliance with one characteristic of the invention, the furnace further comprises measuring sensors which can be implanted inside the furnace, on at least one lateral wall, and at least one pivoting element is placed opposite at least one measuring sensor.

Furthermore, the furnace comprises a system intended to lift simultaneously all the pivoting elements placed on at least one of its sides.

This possibility, preferably reserved for the side called a furnace-charging side, that is to say through which the distributor of the composition is introduced, ensures speed when carrying out panel movements, which is highly appreciated by the users.

Other characteristics, details and advantages of the invention will become better apparent on reading the following description, made by way of non-limiting illustrative example, with reference to the appended drawings in which:

FIG. 1 illustrates schematically a glass-melting furnace (in transverse section), especially equipped with pivoting elements according to the invention.

Figure 1:
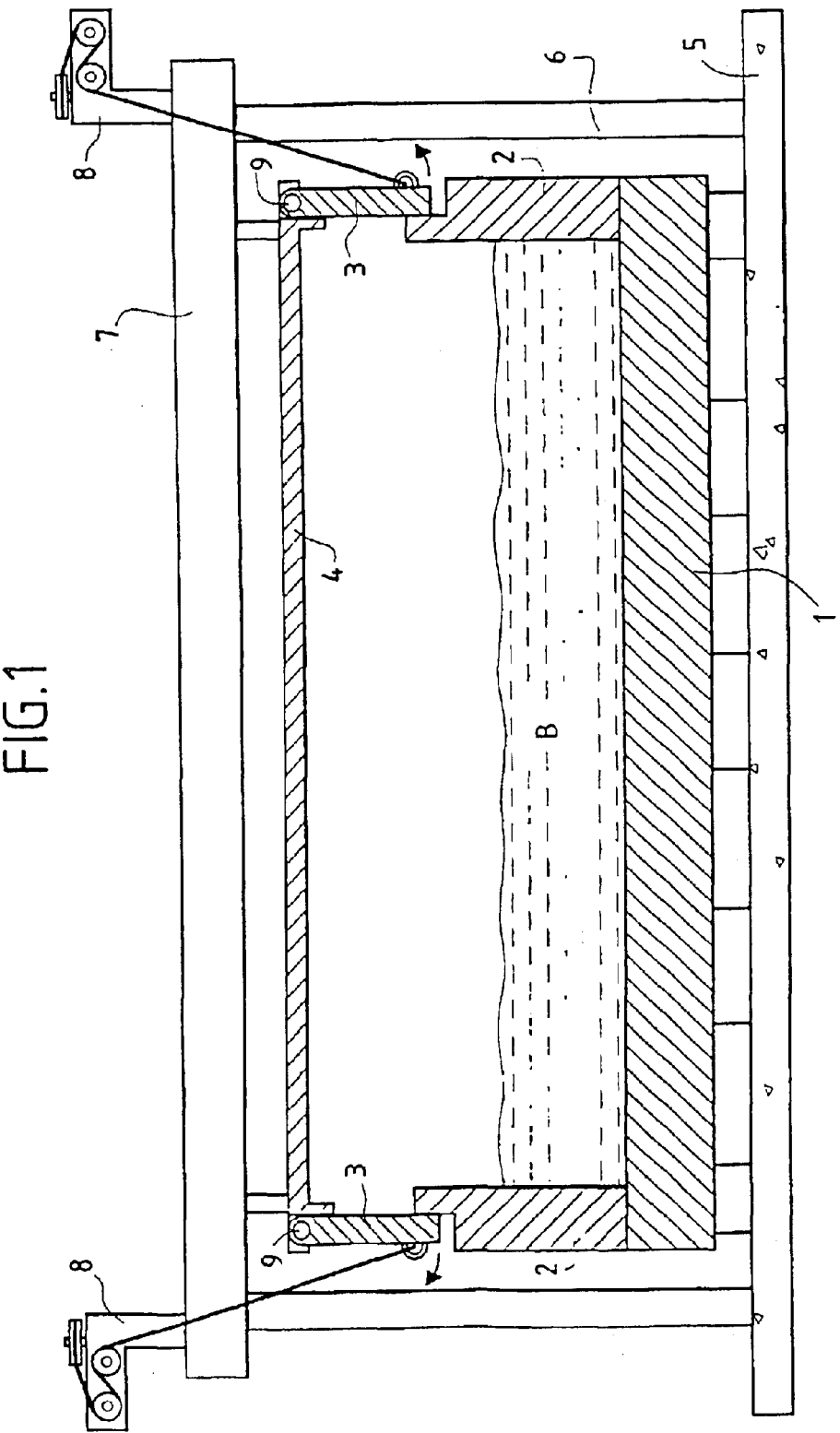
FIG. 1 is a general overall diagram of a glass-melting furnace.

The main constituents of the furnace are referenced as follows: 1 represents the floor which is generally horizontal or quasi-horizontal; 2 relates to the lateral walls or upstands made of refractory materials—the floor 1 and the lateral walls 2 conventionally form a tank B (or vessel) made of refractory materials for the molten glass. The dimensions of the tank B are variable.

The pivoting elements, which will be described in detail below, are referenced 3 while the horizontal roof is illustrated by the reference 4.

A reinforcement is also necessary; the actual furnace in fact rests on a screed 5 which furthermore supports vertical posts 6 intended to support (inter alia) an upper reinforcement 7, to which elements 8 needed to move the pivoting elements 3 and the roof 4 are preferably attached.

The pivoting elements 3 are thus arranged on the periphery of the furnace, above the fixed lateral walls 2. They may pivot about horizontal axes 9 arranged substantially at the level of the horizontal roof 4.

The glass in the tank B may be heated in different ways: in particular, electric heating by electrodes implanted in the floor 1, or else by electrodes called plunging electrodes as described, for example, in patent FR 2 599 734, can be distinguished. Mixed solutions may be envisaged.

Moreover, additional means such as burners (not shown) may be provided in order to apply additional energy either at the start of the process or at particular points in time and/or in space.

The present invention is preferably, but not exclusively, applicable to furnaces equipped with plunging electrodes. It is in this context that it has a large number of advantages which will become better apparent on reading the following description.

Conventionally, the bath of molten glass in the tank B is uniformly covered with raw materials forming an insulating layer. The raw materials may be fed and distributed by a hopper and/or a conveyor which moves above the tank B sweeping over the upper surface of the bath of molten glass present in the tank B as uniformly as possible.

This feed means therefore has to operate between the upper surface of the glass bath and the lower surface of the roof 4.

Up to the present, either permanent openings at this level, or possibly sliding means which release one of the upper lateral sides of the furnace were provided: this latter embodiment is described in patent FR 2 599 734.

However, a permanent opening has the drawback of allowing energy to escape continuously, that is to say in large quantities, hence a poor heat budget.

One or more sliding panels, as provided in the aforementioned patent, represents some improvement from the thermal point of view, but this improvement is however quite relative since the panel on the furnace-charging side is in reality virtually always lifted since it absolutely has to be in the high position when the feed machine is in operation, that is to say the majority of the time. Only the mode called "standby" mode allows the panel or panels to be lowered.

Moreover, in the case of furnaces with plunging electrodes, notches must be provided in the upper movable walls in order to provide a lateral passage for the support arms of the electrodes. This, or rather these openings are therefore necessarily permanent, hence a not inconsiderable energy loss.

The present invention makes it possible in particular to overcome these drawbacks and therefore offers an appreciable improvement with regard to the heat budget: this is because it limits the heat losses above the tank B.

Figure 2:
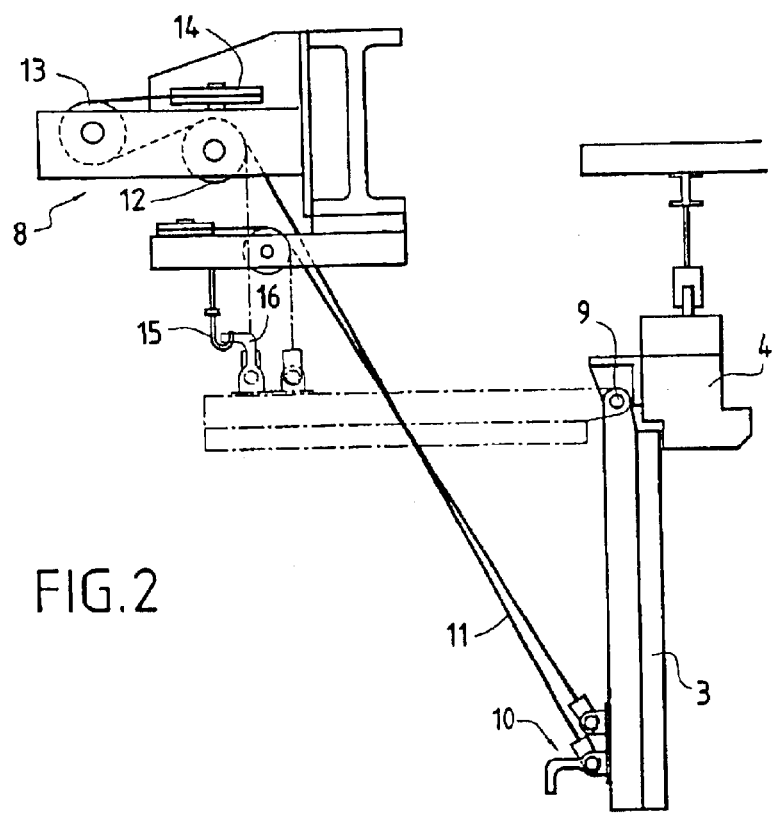
FIG. 2 is a partial and schematic view of a pivoting element cooperating with a lifting means.
Figure 3:
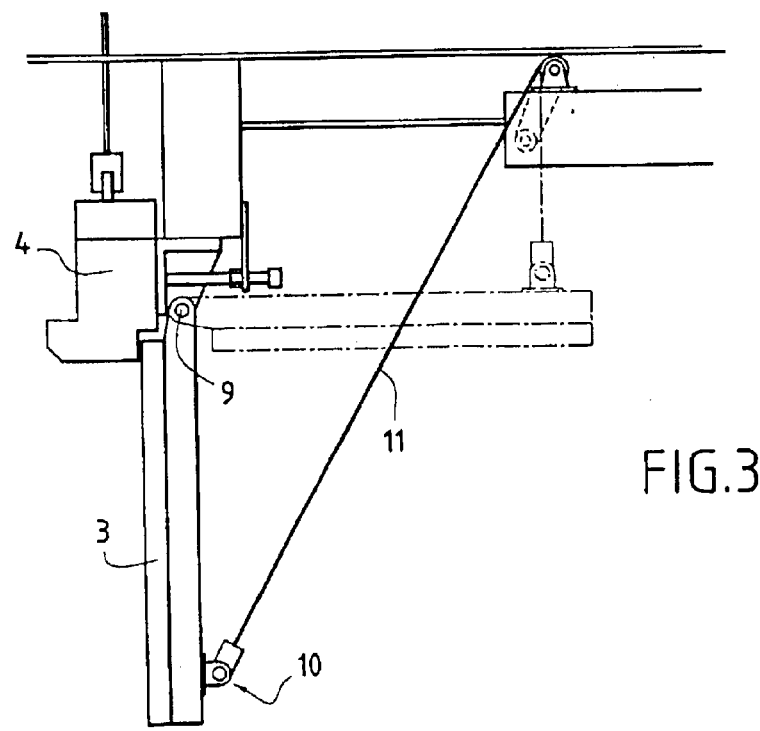
FIG. 3 is a partial and schematic view of another pivoting element cooperating with a lifting means.

Thus, the present invention proposes to equip the furnace with a set of pivoting panels 3 placed at the periphery of the furnace. A certain number of panels are therefore arranged on each of the sides of the furnace, at least on the side called the furnace-charging side, in the place in which the composition feed machine enters the furnace. The panels 3 may pivot about a horizontal axis 9, as illustrated in more detail in FIG. 2 and in FIG. 3.

At the opposite end of the axis 9, a catching element 10 is provided on the surface of the panel outside the tank B. A cable 11 cooperates with the catching element 10 in order to make the panel 3 pivot about the axis 9. The cable 11 is actioned, for example, by a set of pulleys 12, 13, 14 attached to one or more supports 8, already mentioned.

Moreover, when the panels 3 are in the horizontal position, thus making communication possible between the inside of the furnace and the external environment, they may be fixed in this position by hooks 15 which cooperate with a ring 16 connected to the panel 3.

According to one embodiment of the invention, there is an individual control for moving each door, on three sides of the furnace. On the fourth side, in the place where the composition feed machine is introduced into the furnace, the doors may be moved together or individually.

This arrangement makes it possible, on the one hand, to open and close very quickly the side called the furnace-charging side, with a single person to carry out the operation.

Moreover, if the plunging electrodes are implanted on the fourth side, it is possible to close this side while accessing the plunging electrodes.

Furthermore, on the three other sides, the modularity of the opening of panels 3 makes it possible, for example, to act on one element such as an electrode located in the furnace, without disturbing other elements arranged in the furnace. In a furnace with plunging electrodes, provision is advantageously made to arrange one panel 3 opposite each plunging electrode, and an individual lifting element for each of the said panels 3.

Furthermore, a linkage is provided, making it possible to unlatch the security systems 15, 16 from a distance.

Preferably, one linkage is dedicated to the set of panels 3 on the furnace-charging side while several linkages are provided in order to unlatch the various panels 3 placed respectively on the three other sides.

Figure 4:
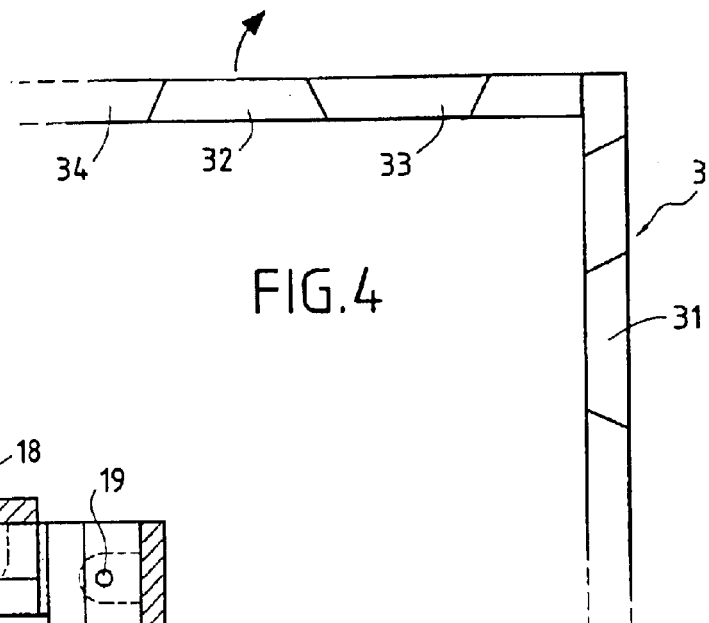
FIG. 4 is a horizontal simplified section of an end zone at the level of the pivoting elements.

Moreover, as shown in FIG. 4, the panels 3 are cut obliquely in their thickness. This makes it possible to improve the seal between said panels, which is a considerable advantage with respect to the prior art. Furthermore, this cutting makes it possible to operate, in a preferred manner, certain panels 3, and/or certain groups of panels. For example, the panel 31 may be opened individually; this will preferably be a panel arranged opposite an electrode. On the other hand, opening the panel 32 will lead to opening neighboring panels 33 and 34.

Figure 5:
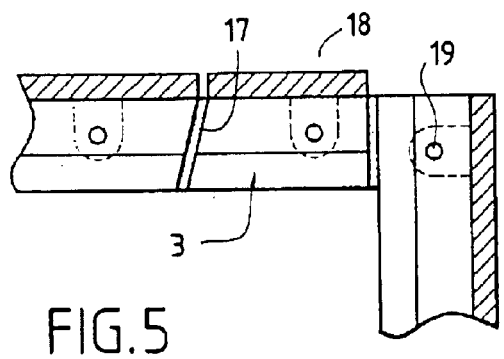
FIG. 5 is a detail of FIG. 4.

FIG. 5 shows in more detail the sealing and the juxtaposition of the panels. A seal 17 is preferably provided between each panel 3. The outer surface of the panels may be covered with a sheet 18 consisting of a material which is highly thermally insulating.

Furthermore, the seal inherent to the invention avoids a recurrent problem of the prior art; thus bursts of flame have frequently developed between non-contiguous panels. Of course, these flames damage the inside of the furnace, which is not much appreciated by users.

Figure 6A:
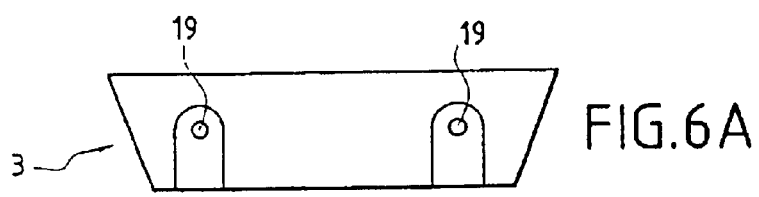
FIGS. 6A, 6B and 6C are sections of various shapes of pivoting elements, in their thickness.
Figure 6B:
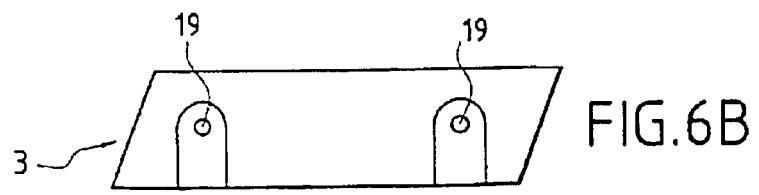
Figure 6C:
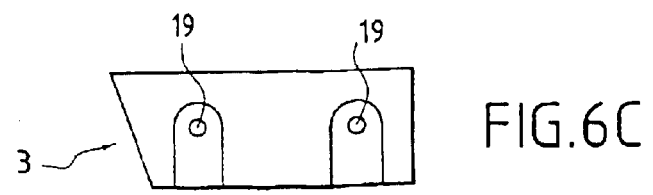

Moreover, reinforcement elements 19 may be integrated within the thickness of the panels 3. FIGS. 6A, 6B and 6C show the possible placements of the elements 19, in three embodiments of panels 3.

The particular juxtaposition of the panels 3 makes it possible to adjust the opening of the upper part of the furnace according to the location of the electrodes but also of the other elements such as sensors or other measuring means. It would thus be possible to provide openings in line with the sensors implanted in the furnace, which would continuously provide information on the state of its inner walls. When one of the sensors is considered defective, it is then possible to open the closest panel and extract the sensor or sensors.

Usually, the sensors are introduced at points in the furnace in order to carry out, for example, wear measurements. Given the configuration of the elements pivoting according to the invention, it is possible to choose a location for the implantation of the sensor or sensors, then to lift the door or doors located in the region chosen in order to implant a sensor therein.

The replacement and/or the repair of elements inside the furnace thus become "easy" interventions which are fast and which do not disturb the general operation of the furnace.

Of course, the simplicity of construction of the set of panels is a not insignificant advantage of the invention. The panels may be operated not only easily but safely and reliably.

The material chosen for the panels 3 is a thermal insulator, which withstands temperatures of about 1500° C. (during furnace shutdowns). It is relatively light.

By way of example, the panels 3 may be made of sillimanite: their thickness may be about 100 mm: their height about 1100 or 1200 mm or even half as much: and their width between 300 and 800 mm or even more.

Another interesting aspect of the invention relates to the flights of dust (created in the furnace): the present structure makes it possible to limit them very effectively in particular since the sealing between panels is very well guaranteed.

The paths usually provided for sucking out dust are thus less called upon so that less raw material is lost. Moreover, most of the time, the furnace is closed on three of its upper sides. When there is a problem, it is therefore very easy according to the invention to close the fourth side, by virtue of the set of means described above.

What is claimed is:

1. An electric glass-melting furnace comprising:
   a floor made of refractory materials;
   four lateral walls;
   an upper roof;
   a glass composition feeder and an output channel for melted glass;
   a set of pivoting elements pivoting about horizontal axes and placed at a periphery of the furnace between at least one of the lateral walls and the roof.

2. The melting furnace as claimed in claim 1, wherein the pivoting elements include flat panels having thicknesses that are cut vertically to create a seal between two contiguous of the flat panels.

3. The melting furnace as claimed in claim 1, further comprising a set of cables, pulleys, and winches configured to make the pivoting elements pivot individually or in a group.

4. The melting furnace as claimed in claim 1, further comprising a mechanism for locking the pivoting elements in an open position.

5. The melting furnace as claimed in claim 4, further comprising a system for unlocking the pivoting elements.

6. The melting furnace as claimed in claim 1, wherein the pivoting elements are mechanically reinforced by reinforcing elements implanted within a thickness of the pivoting elements.

7. The melting furnace as claimed in claim 6, wherein the reinforcing elements include reinforcing rods.

8. The melting furnace as claimed in claim 1, further comprising plunging electrodes, and wherein at least one pivoting element is arranged opposite each plunging electrode.

9. The furnace as claimed in claim 1, further comprising measuring sensors configured to be implanted inside the furnace, on at least one of the lateral walls, and wherein at least one pivoting element is placed opposite at least one of the measuring sensors.

10. The furnace as claimed in claim 1, further comprising a system configured to lift simultaneously all the pivoting elements placed on at least one side of the furnace.

* * * * *